UNITED STATES PATENT OFFICE.

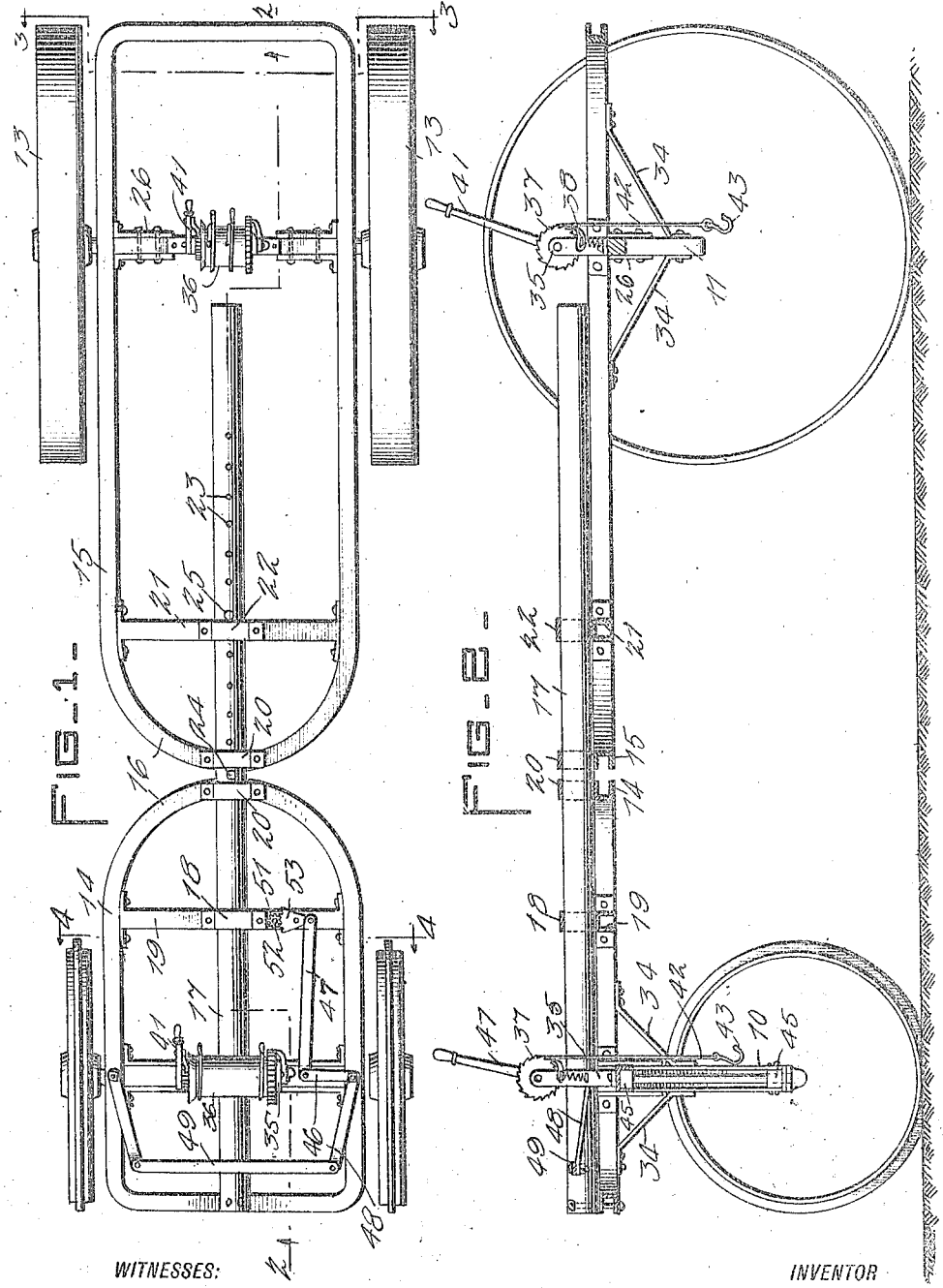

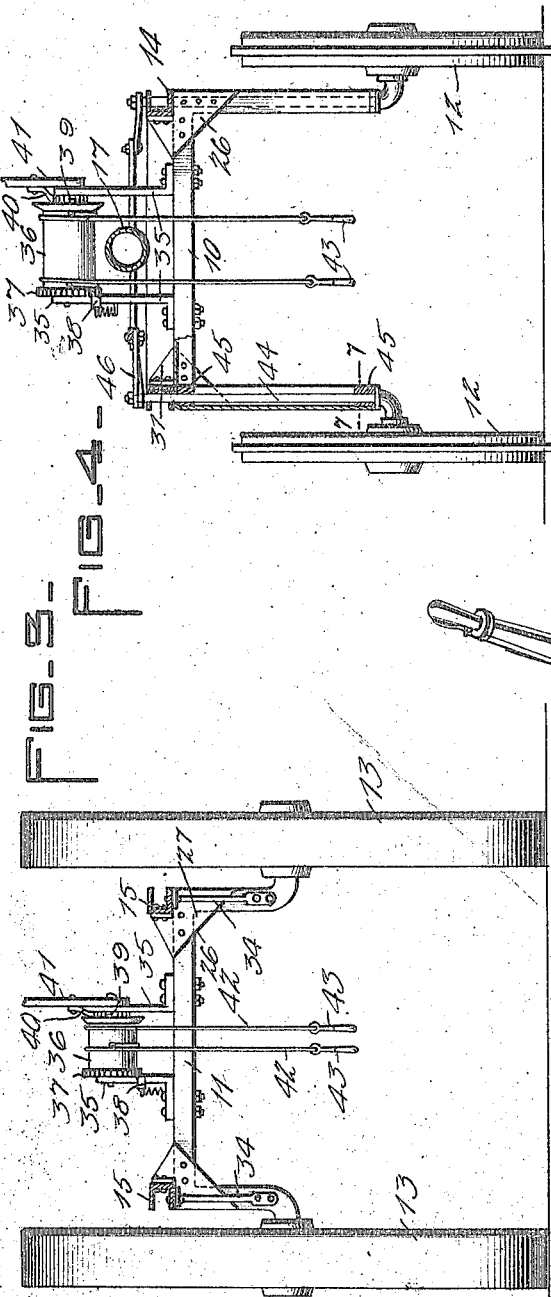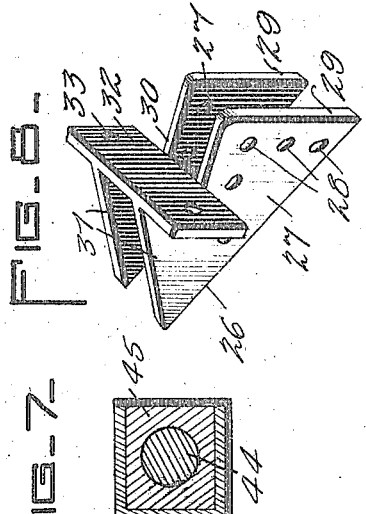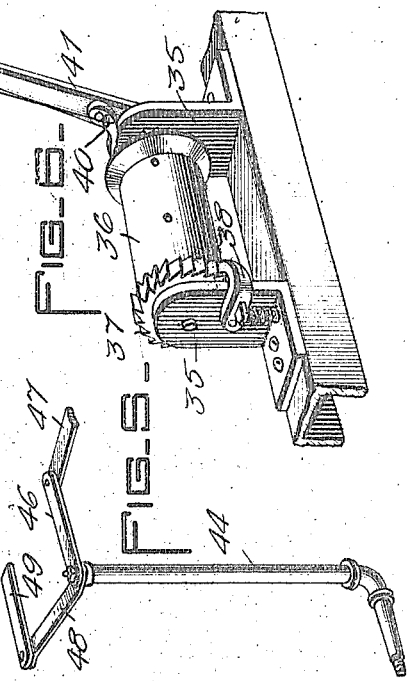

ORLANDO BINFORD, OF MOBILE, ALABAMA.

TRUCK.

1,202,472.	Specification of Letters Patent.	Patented Oct. 24, 1916.

Application filed May 16, 1916. Serial No. 97,835.

*To all whom it may concern:*

Be it known that I, ORLANDO BINFORD, a citizen of the United States, and a resident of Mobile, in the county of Mobile and State of Alabama, have invented an Improvement in Trucks, of which the following is a specification.

This invention is an improvement in vehicles and has particular reference to a truck for hauling logs, lumber, structural material, and the like.

An object of the invention is to facilitate loading and unloading the truck and to this end there is provided a frame supported upon arched axle members and between the sides of which and below said frame the load is suspended, the same being elevated and lowered by suitable mechanism mounted on said axle members.

For the purpose of adapting the truck to different sized loads the frame is made adjustable in length by constructing the same in sections having a common support, one of the sections being movable longitudinally thereof.

The inventive idea involved is capable of receiving a variety of mechanical expressions, one of which, for the purpose of illustrating the invention, is shown in the accompanying drawings, in which—

Figure 1 is a top plan view of the truck constructed in accordance with the invention. Fig. 2 is a longitudinal section on the line 2—2 of Fig. 1. Fig. 3 is a transverse section on the line 3—3 of Fig. 1. Fig. 4 is a transverse section on the line 4—4 of Fig. 1. Fig. 5 is a fragmentary perspective view of a portion of the steering apparatus for the vehicle. Fig. 6 is a similar view of one of the windlass mechanisms employed in connection with the invention. Fig. 7 is a section on the line 7—7 of Fig. 4. Fig. 8 is a detail perspective view of one of the bracing members employed.

There is illustrated in the drawings what is now believed to be a preferred embodiment of the invention wherein the vehicle consists of front and rear arched axle members 10 and 11, respectively, preferably formed of channel iron and having the front and rear wheels 12 and 13 connected thereto. The axle members 10 and 11 are both preferably of inverted U-shaped formation and are of different heights owing to the fact that the sizes of the front and rear wheels are different. The tops of the axle members are arranged in the same horizontal plane and have mounted thereon the vehicle frame which consists of the front and rear sections 14 and 15, respectively, also preferably formed of channel iron and being rounded at their adjacent ends as indicated at 16. The sections 14 and 15 of the frame are supported in their horizontal positions by means of a reach member 17 extending longitudinally of said frame and having its forward end secured to the front of the section 14. This reach member 17 is preferably of hollow cylindrical formation and extends through a bearing 18 carried by the brace 19 extending transversely of the section 14. The adjacent rounded ends 16 of the sections are also provided with bearings 20 through which the member 17 extends and adjacent the forward end of the rear section 15 the same is also provided with a transverse brace 21 similar to the brace 19 and having mounted thereon a bearing 22 similar to the bearings 18 and 20, which also receives the member 17. This member is provided with a longitudinal row of openings 23 which are adapted to receive locking pins 24 and 25, the former being mounted between the bearings 20 while the latter is inserted into the opening 23 adjacent the bearing 22 and in the rear thereof whereby the relative longitudinal movement between the sections 14 and 15 is prevented after the same have been adjusted to their desired positions. Owing to the construction just described it will be evident that the rear section 15 has a rotary movement relative to the longitudinal axis of the member 17 so that when the vehicle is passing over uneven ground relative movement will be permitted between the sections 14 and 15.

The sections of the frame are retained securely in position upon the axle members 10 and 11 by means of brace members 26 preferably formed from a single piece of material and consisting of oppositely disposed plates 27 of similar formation and adapted to receive therebetween the corners of the axle members. All of these braces are of similar construction and, therefore, a description of one will suffice. The plates 27 are provided with a series of openings 28 for receiving suitable fasteners for securing the brace in position so that the vertical and horizontal edges 29 and 30 will be flush with the outer edges of the corners of the axle members. The plates 27 also have inner reinforcing portions 31 which extend above the top of of the axle member to which the brace is secured and formed integrally with said reinforcing portions 31 and extending transversely of the plates in a vertical position is a frame engaging plate 32. The distance along the edges 30 of the plates 27 between the vertical edges 29 and the plate 32 is preferably equal to the width of the channel iron of which the sections 14 and 15 are made. The plate 32 is provided with openings 33 for receiving rivets or other suitable fasteners for securing the section of the frame to the brace. If desired the frame may be further supported in position by means of the diagonal braces 34 one end of each of which is secured to the under side of the section of the frame while the other end is fastened to the adjacent axle member.

The truck is designed to suspend a load between the sides of said axle members and beneath the sections 14 and 15 of the frame. In order to accomplish this purpose the top of each of the axle members 10 and 11 has mounted thereon a windlass mechanism for raising the load to its suspended position as described and also lowering the same to the ground if desired. Each of the windlass mechanisms comprises a pair of oppositely disposed bearings 35 between which is journaled a drum 36 having a ratchet 37 at one end engaged by a spring tensioned pawl 38 which, while in contact with said ratchet 37, prevents rotation of the frame in one direction. The opposite end of the drum 36 is also provided with a ratchet 39 engaged by a pawl 40 pivoted on the operating lever 41 so that when said lever is moved in one direction the pawl 40 causes the drum 36 to rotate in the same direction and winds the flexible elements 42 thereon. This actuation of the operating lever is repeated as many times as necessary to hoist the load to the desired height and when it is desired to lower the same the pawl 38 may be forced downwardly, against the tension of its spring, out of engagement with the ratchet 37 whereupon the flexible elements 42 will unwind from the drum 36. The flexible elements 42 are preferably formed of cable and their free ends are each provided with a hook 43 which is adapted to engage a link of a chain (not shown) which is wound about the load.

Means are also provided for steering the vehicle and consists of vertical rods 44 extending interiorly of the sides of the front axle member 10 and mounted in bearing blocks 45 at the upper and lower ends of said sides. The lower end of each rod 44 is connected in such a way to its corresponding wheels 12 so that when said rod is rotated the wheel will be turned. The upper end of each rod has one end of a link 46 secured thereto and pivotally connecting the other ends of said links is an arm 47. One of the rods 44 also has connected to its upper end a lever 48 which in turn has pivoted thereto one end of an operating arm 49 the other end of which is pivoted to a toothed segment 50 pivoted on a transverse brace 19 and engaging a gear wheel 51 secured to a suitable steering post 52. It will be seen from this description that when the steering post 52 is rotated in either direction the segment 50 is oscillated causing the operating arm 40 to actuate the lever 48 to rotate the vertical rod 44 to which said lever is connected. Through the connections 46 and 47 the opposite rod 44 is also rotated in a similar direction whereupon the wheels 12 are turned as desired.

What is claimed is:

1. A truck comprising arched axle members each including sides and a top, a frame supported on said axle members, a brace member secured to each corner of the axle members and including oppositely disposed plates engaging on each side of the axle member and having reinforcing portions, and a transverse vertically arranged plate connecting said reinforcing portions and engaging the inner sides of the frame.

2. A truck comprising arched axle members, a frame mounted thereon and including relatively adjustable sections having their adjacent ends rounded and provided with alined bearings, transverse braces for each section arranged adjacent the rounded ends thereof, bearings carried by said braces and in alinement with the first named bearings, a reach member secured to one of said sections and extending through all of said bearings, the other section being rotatable about the longitudinal axis of said reach member, and also adjustable longitudinally thereof, means for retaining said other sections in adjusted position, and means carried by each of said axle members for supporting a load between the sides of said axle members below said sections.

ORLANDO BINFORD.